March 31, 1959 C. E. PETERSON 2,880,016
COMBINATION GRILL GUARD AND HITCH
Filed Dec. 16, 1957
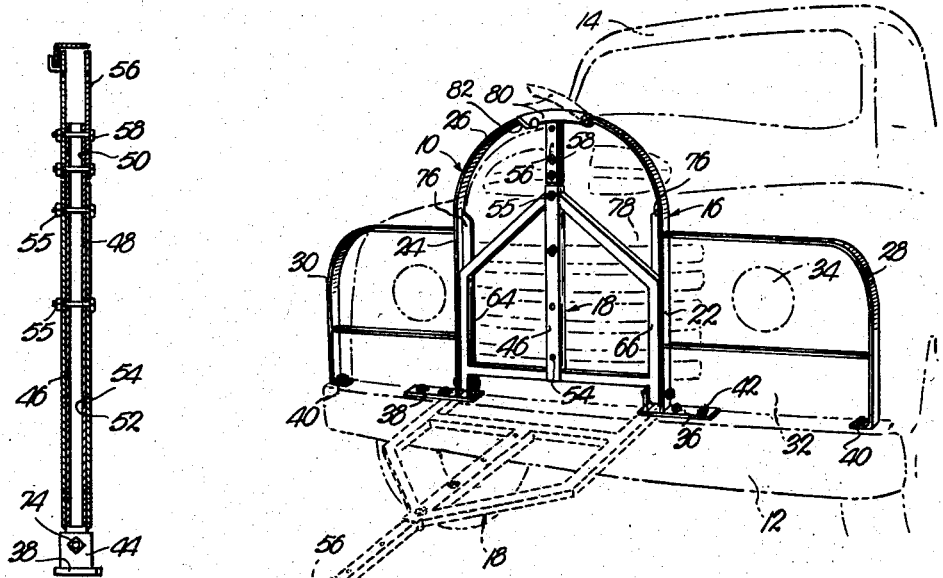
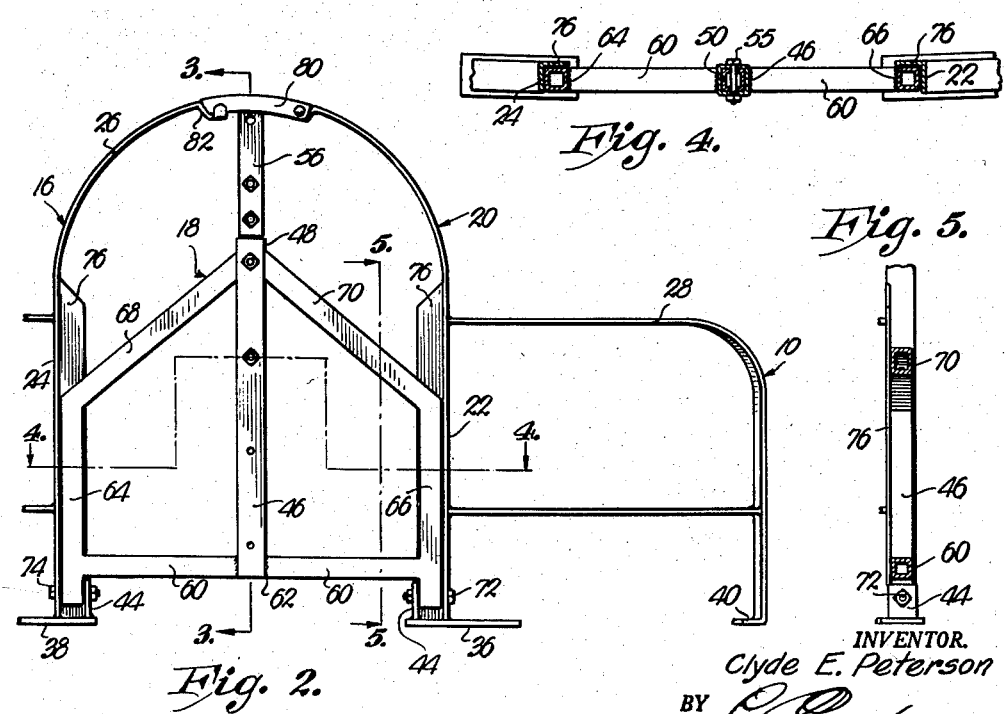
INVENTOR.
Clyde E. Peterson
BY
ATTORNEY.

United States Patent Office 2,880,016
Patented Mar. 31, 1959

2,880,016

COMBINATION GRILL GUARD AND HITCH

Clyde E. Peterson, Morganville, Kans.

Application December 16, 1957, Serial No. 703,161

3 Claims. (Cl. 280—491)

This invention relates broadly to the field of towing devices and the primary object of the invention is to provide a combination grill guard and hitch assembly which is adapted to be mounted on the front end of a mobile vehicle in a manner to protect the grill, lights and fenders of the vehicle and which includes towing structure swingable from an inoperable grill protecting upright position against the main support of the assembly to a substantially horizontal position extending forwardly from the front of the vehicle so that the latter may be towed thereby.

Another important object of the present invention is to provide a combination grill guard and hitch assembly as described, wherein the swingable towing structure includes a pair of telescoped, relatively shiftable sections so that the effective length of the towing arm may be varied at will yet the same may be contracted into a relatively small length prior to moving of the arm to an inoperable, upright position against the grill guard so that the arm presents a neat appearance while retaining the desired grill protecting function.

Also, an important object of this invention is to provide a combination grill guard and hitch assembly which is especially adapted to be mounted on the front bumper of a truck or similar vehicle and which is constructed in a manner to protect the front end of the vehicle without detering from the appearance thereof, which may be relatively easily mounted on and removed from the bumper of the truck and which is configured so that sharp corners are eliminated which would tend to be dangerous to persons working around the front end of the vehicle.

Other important objects of the invention include the provision of locking mechanism on the assembly for releasably maintaining the towing structure in an upright, inoperable position against the main support of the assembly and which may be readily released so that the towing structure may be swung downwardly to its horizontal towing position; to the provision of towing structure including brace means for reinforcing the same but which also serves as additional means for protecting the grill of the vehicle when the towing structure is swung to its upright position; to the provision of a plurality of individually, alignable openings in each of the telescoped sections of the towing arm and an elongated pin insertable into any pair of aligned openings so that the relative positions of the sections may be changed quickly to permit variance of the effective length of the towing arm; and to other lesser important objects and details of construction which will become obvious as the following specification progresses.

In the drawing:

Fig. 1 is a perspective view of a combination grill guard and hitch assembly showing the same mounted on the front bumper of a mobile vehicle illustrated in phantom and additionally showing the horizontal towing position of the towing arm structure in broken lines;

Fig. 2 is an enlarged, fragmentary, front elevational view of the combination grill guard and hitch assembly illustrated in Fig. 1 and showing the same removed from the mobile vehicle; and Figs. 3, 4 and 5 are cross sectional views taken substantially on the lines 3—3, 4—4 and 5—5 of Fig. 2.

A combination grill guard and hitch assembly, designated generally by the numeral 10, is particularly adapted to be mounted on the front bumper 12 of a mobile vehicle 14, such as a truck. Assembly 10 includes as basic components, an upright support 16 and towing arm structure 18 pivotally mounted thereon.

Support 16 may be conveniently constructed of elongated, flat stock, bent into suitable configuration and thus includes a substantially U-shaped component 20 comprising a pair of normally vertical, opposed, spaced members 22 and 24 interconnected at their uppermost ends by a semicircular cross piece 26. Oppositely extending frames 28 and 30 are secured to opposed, outermost faces of members 22 and 24 and are adapted to protect the front fenders 32 and headlights 34 of vehicle 14, as clearly illustrated in Fig. 1.

Horizontal mounting plates 36 and 38 are welded to the lowermost ends of each of the members 22 and 24 respectively while the lowermost ends of each of the frames 28 and 30 are turned inwardly to present integral flanges 40 to facilitate mounting of support 16 on bumper 12. As clearly shown in Fig. 1, flanges 40 and plates 36 and 38 are provided with a number of perforations receiving bolts 42 which pass through a portion of bumper 12 to thereby rigidly secure support 16 on the front end of vehicle 14 in a substantially upright position in protecting relationship to the same.

Each of the mounting plates 36 and 38 is provided with an upright bracket 44, spaced inwardly from its respective member 22 and 24, and adapted to cooperate with members 22 and 24 for pivotally mounting towing arm structure 18 on support 16. Towing arm structure 16 includes an elongated tubular section 46 which is parallel with members 22 and 24 when structure 16 is in an upright position as illustrated in Fig. 2, and telescoped within the outermost end 48 of section 46 is a second tubular section 50, provided with a series of perforations 52 alignable with similar openings 54 provided within section 46, perforations 52 and openings 54 being adapted to receive bolts 55 when any pair of the same are in alignment. A coupler 56 is secured to the outermost portion of section 48 by a suitable bolt and nut means 58 so that various types of vehicles may be readily attached to towing arm 18.

Means for pivotally mounting section 46 on support 16 includes a pair of tubular elements 60, welded to the inner end 62 of section 46, and extending outwardly therefrom in opposite directions adjacent the lowermost ends of members 22 and 24. Towing structure 18 also includes a pair of elongated, spaced, tubular legs 64 and 66 disposed in parallel relationship with members 22 and 24 respectively, it being noted that legs 64 and 66 are connected to the outermost ends of elements 60 and extend into the space between members 22 and 24 and their respective brackets 44. Inwardly converging braces 68 and 70 are welded to the ends of legs 64 and 66 remote from elements 60 and are suitably secured to section 46 adjacent end 48 thereof.

Towing structure 18 is swingably mounted on support 16 by virtue of a pivot bolt 72 passing through member 22, leg 66 and its respective bracket 44 as well as a similar bolt 74 passing through member 24, leg 64 and the proximal bracket 44.

A pair of elongated stops 76 are secured to members 22 and 24 respectively adjacent the longitudinal edges thereof normally proximal to the grill 78 of vehicle 14 and are positioned to limit swinging movement of towing structure 18 toward vehicle 14. As clearly shown in Fig. 2, stops 76 limit movement of towing structure 18 to a position so that the latter lies substantially in the plane of U-component 20.

An elongated lock arm 80 is pivotally mounted on cross piece 26 adjacent the uppermost portion thereof and on the normally forward edge thereof in a position to releasably engage coupler 56 for maintaining towing structure 18 in its upright position. A latch 82 secured to cross piece 26 limits downward swinging movement of arm 80 so that releasable engagement of the latter with coupler 56 is assured until arm 80 is swung upwardly to clear the outermost end of towing structure 18.

In operation, after assembly 10 has been suitably mounted on bumper 12 by utilization of bolts 42, towing structure 18 is normally disposed in its upright, inoperable position against support 16 and maintained in such position by arm 80 until it is desired to tow vehicle 14 by a suitable tractor or the like, whereupon arm 80 is swung upwardly to clear the outermost end of coupler 56 to permit towing structure 18 to be swung about a horizontal axis to a location extending forwardly from the front end of vehicle 14, as illustrated in Fig. 1. In such horizontal position, towing structure 18 may be readily connected to the tractor or the like so that vehicle 14 may be towed behind the same. It is to be emphasized that because of the telescoped relation of sections 46 and 50, the effective towing length of structure 18 may be varied at will by merely changing the positions of bolts 55 within perforations 52 and openings 54. A ball coupler may be attached to section 50 in lieu of coupler 56 and thus towing structure may be suitably connected to any type of hitch on the towing vehicle.

Assembly 10 is of particular value to those engaged in agriculture inasmuch as the vehicle 14 may be connected to a tractor or the like when the tractor is driven to the field, so that if it is desired to return to the farm buildings or if it is necessary to go to another location for parts or the like, vehicle 14 is readily available and the trip may be accomplished much more quickly because of the fact that it ordinarily would be necessary to uncouple the implements from the tractor and then drive the same at a very slow rate. The present assembly solves this problem by virtue of the fact that the vehicle 14 may be towed behind the tractor and thus is readily available for use, but it should also be recognized that assembly 10 serves the additional function of protecting the front end of vehicle 14 without in any manner detering from the overall appearance thereof, and, furthermore, may be readily removed from bumper 12 if so desired. Assembly 10 is of great utility in the construction field also because additional trucks may be taken to the work site and then left until the work is completed without the necessity of driving the same back and forth during construction operations.

The extensible nature of towing structure 18 is a very important factor because many tractors have hitches disposed in a position such that a very long towing arm is necessary to hook the vehicle to the tractor, but it would be substantially impractical to provide a one piece arm of this length because the same would extend upwardly too far when the arm was moved to its vertical position. Towing structure 18 may be extended to fit all types of hitches, and, furthermore, the turning radius of the interconnected vehicles may be varied at will to suit the desired circumstances.

The particular mounting brackets which are employed to mount assembly 10 on a vehicle such as 14 will necessarily vary according to the type of vehicle upon which the unit is to be mounted. For example, plates 36 and 38 and inturned flanges 40 may be changed so that assembly 10 may be mounted on the front portion of bumper 12 if this is necessary to assure that assembly 10 and in particular, towing structure 18, clears grill 78 of vehicle 14. Likewise, provision may be made for clamping plates 36 and 38 and flanges 40 to the bumper brackets of vehicle 14 and thereby facilitate mounting of assembly 10 on vehicle 14. It should also be noted that assembly 10 may be manufactured in conjunction with a unitary bumper which would be mountable on the front end of vehicle 14 in lieu of bumper 12 to thereby permit provision of a much stronger unit than would ordinarily be the case if assembly 10 were merely mounted on an existing bumper 12. Manifestly, many changes such as this can be made without departing from the spirit of the instant invention and it is intended to be limited only by the scope of the appended claims.

Having thus described the invention, what is claimed as new and desired to be secured by Letters Patent is:

1. A combination grill guard and hitch assembly comprising an upright support adapted to be mounted on the front end of a mobile vehicle in partially protecting relationship to the same, said support including a pair of opposed, spaced, upright members and a semi-circular cross-piece integral with and interconnecting the uppermost portions of said members; an elongated element spanning the distance between said members adjacent the lowermost ends thereof; towing structure secured to said element; means pivotally mounting the element on said members for swinging movement on a horizontal axis whereby the structure may be swung from an inoperable, grill protecting, upright position engaging the support and substantially within the plane of said members to a substantially horizontal location extending forwardly from said front end of the vehicle, said structure including a pair of relatively movable sections whereby the effective length of the structure may be selectively varied; a stop element secured to each of said members respectively adjacent the normally innermost longitudinal edges thereof and extending inwardly into the space between the same for limiting the movement of said structure toward the front end of said vehicle; and an arm pivotally mounted on said semi-circular cross-piece adjacent the uppermost portion thereof and engageable with one of said sections of the structure for releasably limiting swinging movement of the latter from said position thereof to said location.

2. A combination grill guard and hitch as set forth in claim 1, wherein said support includes continuous framework extending outwardly in opposite directions from said members for protecting the lights and fenders of said mobile vehicle, said framework having the outermost ends thereof secured to the vehicle.

3. A combination grill guard and hitch as set forth in claim 2 wherein said structure includes a pair of relatively converging braces lying in a common plane with said sections and connected to said element and one of said sections, said braces each engaging one of said stop elements when said structure is swung to its grill protecting, upright position.

References Cited in the file of this patent
UNITED STATES PATENTS

| | | |
|---|---|---|
| 2,378,504 | Roos | June 19, 1945 |
| 2,518,816 | Powers | Aug. 15, 1950 |
| 2,760,789 | Wampler | Aug. 28, 1956 |